(No Model.)
J. JUEL.
SELF FEEDER FOR THRASHING MACHINES.
No. 507,438. Patented Oct. 24, 1893.
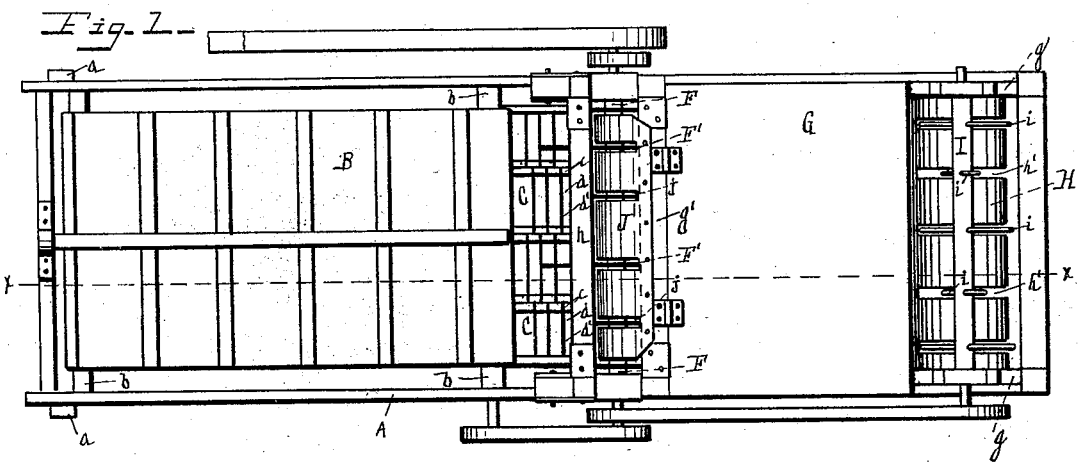
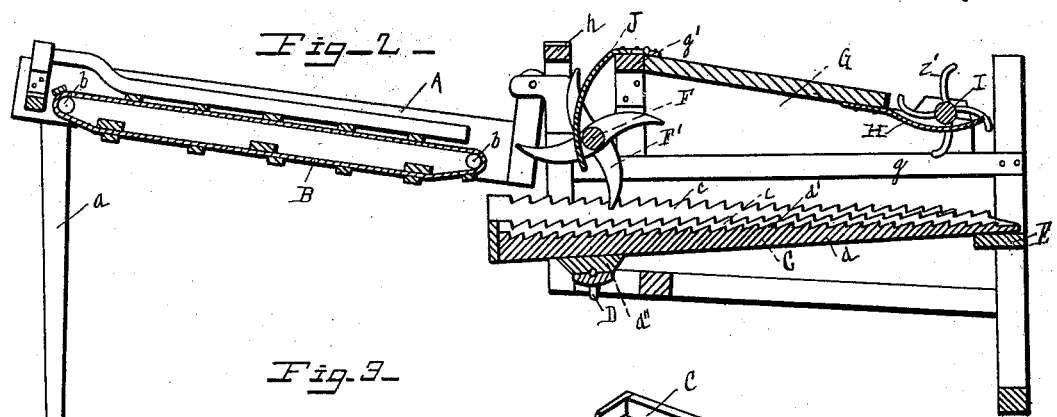
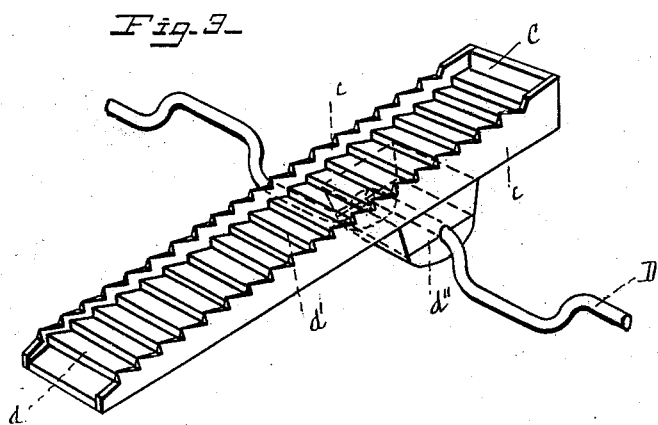
WITNESSES
Geo. M. Anderson
Phil. C. Masi
INVENTOR
John Juel
by E. W. Anderson
his Attorney

UNITED STATES PATENT OFFICE.

JOHN JUEL, OF LARCHWOOD, IOWA.

SELF-FEEDER FOR THRASHING-MACHINES.

SPECIFICATION forming part of Letters Patent No. 507,438, dated October 24, 1893.

Application filed June 2, 1893. Serial No. 476,354. (No model.)

*To all whom it may concern:*

Be it known that I, JOHN JUEL, a citizen of the United States, and a resident of Larchwood, in the county of Lyon and State of Iowa, have invented certain new and useful Improvements in Self-Feeders for Thrashing-Machines; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 is a top plan view of the machine. Fig. 2 is a vertical longitudinal section of same, and Fig. 3 is a perspective view in detail of a box or trough.

This invention has relation to certain new and useful improvements in band cutters and feeders for thrashing machines, and it consists in the novel construction and combination of parts, all as hereinafter described and pointed out in the claim.

Referring to the accompanying drawings, the letter A designates the bundle carrier, hinged at its forward end to the frame of the feeder. Said carrier at its rear portion is supported upon the pivoted folding legs $a, a$. Said carrier has the usual endless traveling apron or canvas B, carried by the rollers $b, b$, and driven by any suitable gear connection with the driving gear of the band cutter or feeder, or of the separator.

The feeder consists of a series of longitudinal boxes or troughs C, consisting each of the side pieces $c, c$, having their upper edge portions serrated or toothed, and the bottom pieces $d$, which are formed with a series of transverse corrugations $d'$, which are inclined toward the rear end of the feeder. Said boxes constituting the feed table are placed side by side in close relation to each other, and are carried upon a crank shaft D, journaled transversely thereunder. Said cranks are set at opposite angles, alternately, and loosely engage bearing blocks $d''$ on the under sides of the feeders.

The forward or discharge ends of the feeders are supported upon a transverse bar E of the frame, upon which they are free to move upon the rotation of the crank shaft.

F designates the band cutter, which consists of a rotary shaft, journaled transversely over the rear portions of the feeders, and carrying a series of curved blades or cutter fingers F', projecting at various angles from the shaft.

G designates a hood or guard which at its rear end portion is hinged to a transverse bar $g'$ above the rear portions of the feeder boxes. The side portions of said guard are of triangular form and rest upon the lateral bars $g$ of the frame. The apex ends of said side pieces extend beyond the main portion of the top of the guard, and are provided with bearings for a transverse beater or feeder shaft I. The space between the forward portions of said side pieces, forward of the main portion of the top of the guard is closed by a metal plate H, above which the shaft I is journaled, and which is formed with a series of slots $h$. The shaft I carries a series of curved fingers $i$ which work through the slots $h$. Secured to the said cross bar $g$, to the rear of the guard G is a depending plate J which overhangs the cutter shaft, and extends below and to the rear of said shaft. Said plate J is formed with a series of slots $j$ through which the cutters revolve.

The guard G, together with the plate J almost completely covers over and incloses the feeder boxes, while the hinge connection of the guard with the frame allows it to be readily turned over back away from said boxes, carrying with it the shaft I so that the table may be readily cleaned. The guard when so turned back may be supported upon a transverse bar $h$, which also forms the support for the bundle carrier when the latter is turned upwardly on its hinges. The plates H and J, it will be noted, serve to prevent the grain from becoming wound upon the cutter and beater shafts.

As the bundles are discharged from the carrier A, they come under the action of the rotary cutter blades or fingers, which cut the bands. The revolution of the crank shaft D causes an up and down, back and forth movement of the feeders, which movement distributes the grain equally, and also causes it to move along over the feeders to the discharge, assisted by the notches and corrugations. The rotary fingers $i$ of the shaft I assist the discharge of the grain from the feeders into the throat of the separator or thrasher.

Having thus described my invention, what I claim, and desire to secure by Letters Patent, is—

In a band cutter and feeder, the combination of the frame, the reciprocating feeder boxes forming the table, the transverse frame bar $g'$ above the rear portion of said table the guard plate G hinged to said bar, and having triangular side portions normally resting on lateral bars $g$ of the frame, the beater or feeder shaft journaled in the forward end portions of said side portions, the plate H forming the forward portion of said guard and extending underneath said shaft, said plate being slotted to permit the rotation of the beater or feeder arms carried by said shaft, the cutter shaft journaled over the rear portion of the table, the depending slotted guard J secured to the bar $g'$ and extending to the rear of and below said shaft, and the bar $h$ to the rear of the bar $g'$, said guard G being arranged to turn back on its hinges away from said table into position to rest on said bar $h$, and carrying with it the said beater or feeder shaft, substantially as specified.

In testimony whereof I affix my signature in presence of two witnesses.

JOHN JUEL.

Witnesses:
H. M. REDFIELD,
PERRY JUEL.